United States Patent

Lucas

(10) Patent No.: US 9,534,505 B2
(45) Date of Patent: Jan. 3, 2017

(54) INTEGRATED NACELLE INLET AND METALLIC FAN CONTAINMENT CASE

(75) Inventor: James L. Lucas, Hamden, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 897 days.

(21) Appl. No.: 13/555,303

(22) Filed: Jul. 23, 2012

(65) Prior Publication Data

US 2014/0023492 A1    Jan. 23, 2014

(51) Int. Cl.
   *F01D 21/04*    (2006.01)
   *B64D 33/02*    (2006.01)

(52) U.S. Cl.
   CPC .............. *F01D 21/045* (2013.01); *B64D 33/02* (2013.01); *Y02T 50/672* (2013.01)

(58) Field of Classification Search
   CPC ....... F01D 21/045; B64D 33/02; Y02T 50/672
   USPC ................................ 415/9, 173.1, 173.4, 200
   See application file for complete search history.

(56) References Cited

U.S. PATENT DOCUMENTS

| | | | |
|---|---|---|---|
| 3,566,606 A * | 3/1971 | Mortlock | 60/226.1 |
| 4,155,221 A | 5/1979 | Dhoore et al. | |
| 4,469,132 A * | 9/1984 | Redington | 137/601.06 |
| 5,251,435 A | 10/1993 | Pauley | |
| 5,259,724 A * | 11/1993 | Liston et al. | 415/9 |
| 6,328,258 B1 * | 12/2001 | Porte | 244/53 B |
| 6,575,694 B1 * | 6/2003 | Thompson et al. | 415/9 |
| 6,725,542 B1 * | 4/2004 | Maguire | 29/890.01 |
| 7,090,165 B2 | 8/2006 | Jones et al. | |
| 7,588,212 B2 | 9/2009 | Moe et al. | |
| 7,900,872 B2 * | 3/2011 | Sternberger | 244/134 C |
| 8,092,169 B2 | 1/2012 | Cloft et al. | |
| 8,197,191 B2 | 6/2012 | Binks et al. | |
| 8,267,642 B2 * | 9/2012 | Binks et al. | 415/119 |

(Continued)

FOREIGN PATENT DOCUMENTS

| | | |
|---|---|---|
| EP | 0 540 193 | 5/1993 |
| EP | 0 837 247 | 4/1998 |

(Continued)

OTHER PUBLICATIONS

International Search Report and Written Opinion for International Application No. PCT/US2013/046979 completed on Sep. 17, 2013.

(Continued)

*Primary Examiner* — Christopher Verdier
*Assistant Examiner* — Brian O Peters
(74) *Attorney, Agent, or Firm* — Carlson, Gaskey & Olds, P.C.

(57) ABSTRACT

A fan nacelle includes a metallic fan containment case. A nacelle inlet is secured to the metallic fan containment case by permanent fastening elements. A gas turbine engine includes a metallic fan containment case. A core engine has a static engine structure housing a compressor section, a combustor section and a turbine section. The core engine is configured to receive core airflow. A fan is arranged within the metallic fan containment case. The fan is coupled to the core engine and is arranged in a bypass flowpath provided between the core engine and the metallic fan containment case. A nacelle inlet is secured to the metallic fan containment case by permanent fastening elements.

26 Claims, 2 Drawing Sheets

(56) References Cited

U.S. PATENT DOCUMENTS

| | | |
|---|---|---|
| 2004/0238687 A1 | 12/2004 | Jones et al. |
| 2005/0006529 A1 | 1/2005 | Moe et al. |
| 2006/0034682 A1* | 2/2006 | McMillan .................. 415/173.4 |
| 2008/0078612 A1 | 4/2008 | Strunk |
| 2009/0255589 A1 | 10/2009 | Porte et al. |
| 2009/0293497 A1 | 12/2009 | Cloft |
| 2011/0052383 A1 | 3/2011 | Lussier |
| 2011/0197973 A1 | 8/2011 | Binks et al. |
| 2012/0076647 A1 | 3/2012 | Robertson, Jr. et al. |

FOREIGN PATENT DOCUMENTS

| | | |
|---|---|---|
| EP | 1 582 702 | 10/2005 |
| EP | 2 014 550 | 1/2009 |
| EP | 2 128 402 | 12/2009 |
| EP | 2149680 A2 * | 2/2010 |
| EP | 2163748 | 3/2010 |
| EP | 2256302 | 12/2010 |
| FR | 2 855 497 | 12/2004 |
| GB | 2 259 287 | 3/1993 |
| GB | 2 434 837 | 8/2007 |

OTHER PUBLICATIONS

European Search Report for EP Application No. 09251301.9, Feb. 1, 2010.
International Preliminary Report on Patentability for International Application No. PCT/US2013/046979 mailed Feb. 5, 2015.
Extended EP Search Report for 13823850.6 completed Jun. 30, 2015.

\* cited by examiner

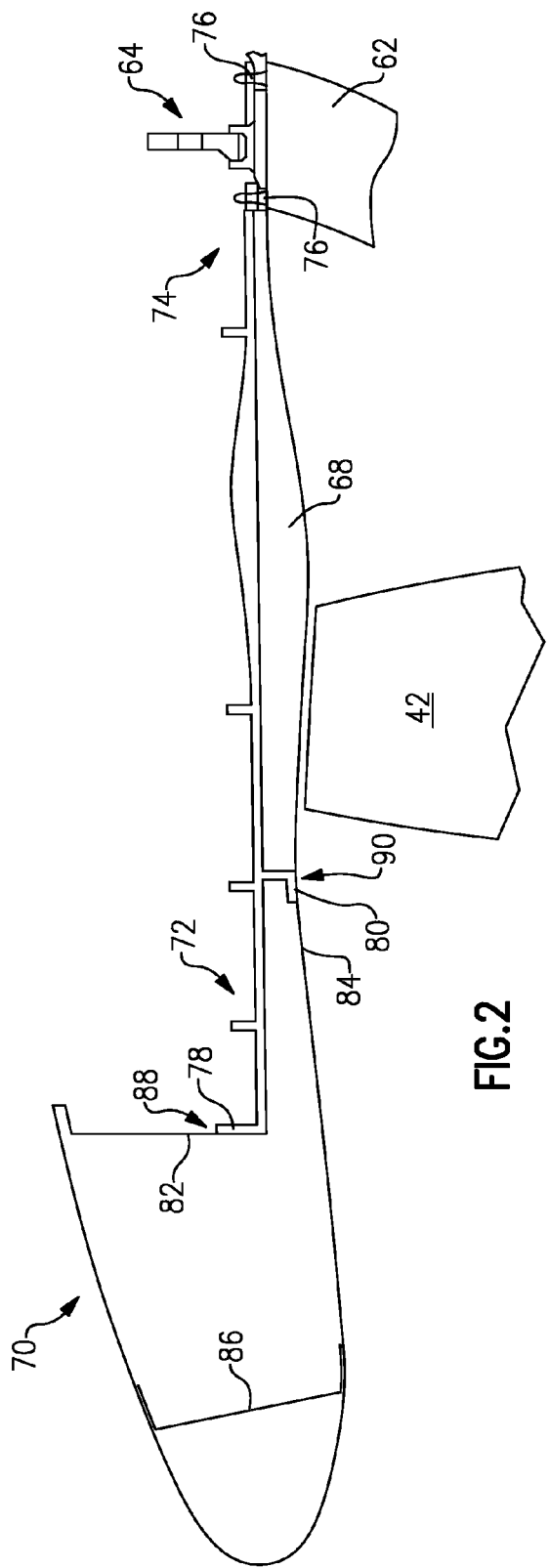

INTEGRATED NACELLE INLET AND METALLIC FAN CONTAINMENT CASE

BACKGROUND

This disclosure relates to an integrated nacelle inlet and metallic fan case.

One type of gas turbine engine includes a fan driven by a core engine. The fan is arranged in a bypass flowpath, which is provided between the core engine and a fan nacelle. The fan nacelle houses a fan containment case that surrounds the fan. The fan containment case supports structure that provides a seal relative to the fan and retains debris during a fan blade-out event.

The fan nacelle also includes a fan nacelle inlet arranged upstream from the fan to provide a smooth entry for airflow into the bypass flowpath. Typically, the fan nacelle inlet has been secured to a metallic fan case by removable means, such as nuts and bolts. In one application, a composite fan case has been used, and the nacelle inlet has been integrated with the composite fan case to provide a unitary composite structure.

SUMMARY

In one exemplary embodiment, a fan nacelle includes a metallic fan containment case. A nacelle inlet is secured to the metallic fan containment case by permanent fastening elements.

In a further embodiment of any of the above, the nacelle inlet is a metallic structure.

In a further embodiment of any of the above, the nacelle inlet is a composite structure.

In a further embodiment of any of the above, the permanent fastening elements is an adhesive.

In a further embodiment of any of the above, the permanent fastening elements is a weld.

In a further embodiment of any of the above, the permanent fastening elements is a rivet.

In a further embodiment of any of the above, the fan containment case supports a rub strip configured to provide a seal relative to a fan.

In a further embodiment of any of the above, the fan containment case includes first and second flanges. The nacelle inlet includes first and second walls respectively secured to the first and second flanges by the permanent fastening elements.

In one exemplary embodiment, a gas turbine engine includes a metallic fan containment case. A core engine has a static engine structure housing a compressor section, a combustor section and a turbine section. The core engine is configured to receive core airflow. A fan is arranged within the metallic fan containment case. The fan is coupled to the core engine and is arranged in a bypass flowpath provided between the core engine and the metallic fan containment case. A nacelle inlet is secured to the metallic fan containment case by permanent fastening elements.

In a further embodiment of any of the above, the nacelle inlet is a metallic structure.

In a further embodiment of any of the above, the nacelle inlet is a composite structure.

In a further embodiment of any of the above, the permanent fastening elements is an adhesive.

In a further embodiment of any of the above, the permanent fastening elements is a weld.

In a further embodiment of any of the above, the permanent fastening elements is a rivet.

In a further embodiment of any of the above, the fan containment case supports a rub strip configured to provide a seal relative to a fan.

In a further embodiment of any of the above, the fan containment case includes first and second flanges. The nacelle inlet includes first and second walls respectively secured to the first and second flanges by the permanent fastening elements.

BRIEF DESCRIPTION OF THE DRAWINGS

The disclosure can be further understood by reference to the following detailed description when considered in connection with the accompanying drawings wherein:

FIG. 2 is an enlarged sectional view of a fan containment case and a nacelle inlet shown in FIG. 1.

FIGS. 3A and 3B schematically illustrate one permanent connection between the fan containment case and the nacelle inlet.

FIGS. 4A and 4B schematically illustrates another permanent connection between the fan containment case and the nacelle inlet.

DETAILED DESCRIPTION

Figure 1:
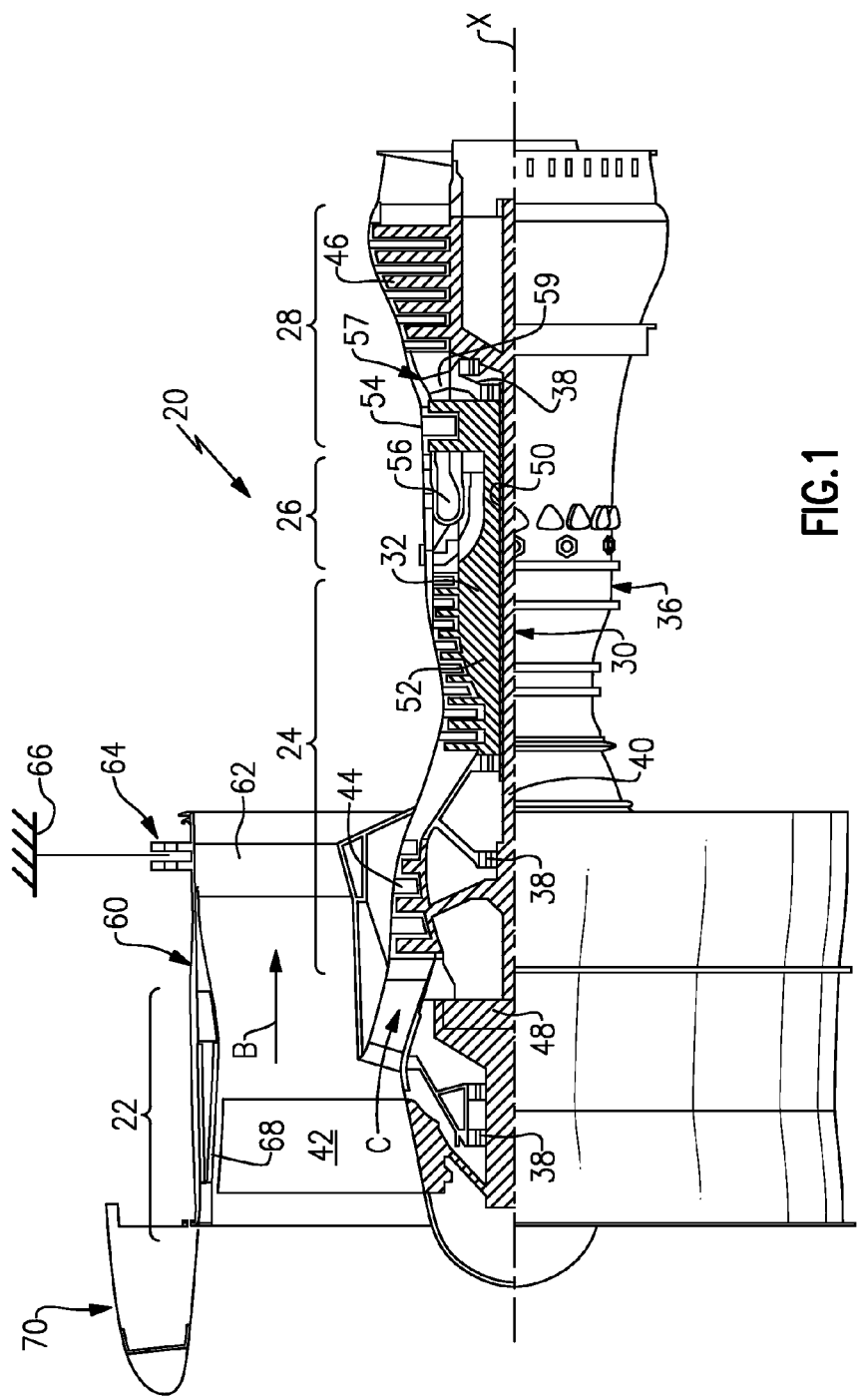
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/518.7)0.5]. The "Low corrected fan tip speed", as disclosed herein according to one non-limiting embodiment, is less than about 1150 ft/second.

With continuing reference to FIG. 1, the engine 20 includes a fan containment case 60 surrounding the fan section 22. The fan containment case 60 provides a mount 64 configured to attach to a pylon 66 of an aircraft. In the example, the mount 64 is generally axially aligned with the flow exit guide vanes 62. The fan containment case 60 is cylindrical metallic structure constructed from, for example, an aluminum alloy or a nickel alloy. A nacelle inlet 70 is permanently secured to the fan containment case 60 and is arranged upstream from the fan section 22. The nacelle inlet 70 may be constructed from metallic material, such as aluminum, or a composite material, such as a fiber reinforced resin.

Referring to FIG. 2, the fan containment case 60 supports a rub strip 68 arranged adjacent to the tips of the fan blades 42. The rub strip 68 provides a generally close-fitting seal with the fan blades 42 and may be constructed of an abrasion-resistant material. The rub strip 68 typically is constructed from multiple layered components, such as an aluminum honeycomb material and an abrasive-embedded epoxy.

The fan containment case includes forward and aft ends 72, 74 axially spaced apart from one another. The mount 64 is provided at the aft end 74, which is secured to the flow exit guide vanes 62 via fasteners 76, for example.

In one example, first and second attachments or flanges 78, 80 are provided at the forward end 72. The nacelle inlet 70 includes first and second walls 82, 84 that are respectively secured to the first and second flanges 78, 80 at first and second joints 88, 90, respectively. The nacelle inlet 70 includes an annular cavity provided between the first and second walls 82, 84. One or more reinforcing members 86 are secured between the first and second walls 82, 84 to maintain the desired contour of the nacelle inlet 70.

Referring to FIGS. 3A and 3B, first and second fastening elements 92, 94 are used at the first and second joints 88, 90 to provide a permanent connection at the joints. In this manner, a light, unitary structure may be provided with a metallic fan case without the need of relatively heavy threaded fasteners. "Permanent" means that the fan nacelle inlet and fan containment case are permanently joined to one another at the joint, such that a destructive means must be used to separate the nacelle inlet from the fan containment case. "Destructive means" means that the nacelle inlet, the fan containment case and/or the fastening elements must be plastically deformed or irreparably damaged during removal of the nacelle inlet from the fan containment case.

Referring to FIG. 3A, the first wall 82 is secured to the first flange 78 by the first fastening element 92 at the first joint 88. In one example, the first fastening element is an adhesive or a weld, depending upon the materials of the fan containment case and the nacelle inlet. Referring to FIG. 3B, the second wall 84 is secured to the second flange 80 by the second fastening element 94 at the second joint 90. In one example, the second fastening element 94 is an adhesive or a weld.

Referring to FIGS. 4A and 4B, the first and second fastening elements 192, 194 may be provided by rivets. The first and second fastening elements 192 provide a permanent connection between the nacelle inlet and the fan containment case. The first wall 182 is secured to the first flange 178 by the first fastening element 192 at the first joint 188. The second wall 184 is secured to the second flange 180 by the second fastening element 194 at the second joint 190.

Although example embodiments have been disclosed, a worker of ordinary skill in this art would recognize that certain modifications would come within the scope of the claims. For example, permanent fastening elements other than adhesive, welds or rivets may be used. For that reason, the following claims should be studied to determine their true scope and content.

What is claimed is:

1. A fan nacelle comprising:
   a metallic fan containment case includes first and second flanges;
   a nacelle inlet secured to the metallic fan containment case by permanent fastening elements, wherein the nacelle inlet has an arcuate hollow cross-section, an apex of the arcuate cross-section provides a forward-most portion of the fan nacelle, the nacelle inlet is configured to provide a smooth entry for fluid into the fan nacelle, and wherein the nacelle inlet includes a first wall substantially perpendicular to a second wall, the first and second walls respectively secured to the first and second flanges by the permanent fastening elements; and
   a rub strip supported by the fan containment case and configured to provide a seal relative to a fan.

2. The fan nacelle according to claim 1, wherein the nacelle inlet is a metallic structure.

3. The fan nacelle according to claim 1, wherein the nacelle inlet is a composite structure.

4. The fan nacelle according to claim 1, wherein the permanent fastening elements is an adhesive.

5. The fan nacelle according to claim 1, wherein the permanent fastening elements is a weld.

6. The fan nacelle according to claim 1, wherein the permanent fastening elements is a rivet.

7. The fan nacelle according to claim 1, wherein the nacelle inlet is C-shaped.

8. The fan nacelle according to claim 1, the metallic fan containment case having a mount at an aft end configured to be secured to flow exit guide vanes.

9. The fan nacelle according to claim 1, wherein the first and second flanges are positioned at a forward end of the metallic fan containment case.

10. The fan nacelle according to claim 1, wherein the nacelle inlet includes an annular cavity between the first and second walls.

11. The fan nacelle according to claim 1, wherein the nacelle inlet includes a reinforcing member secured between the first and second walls.

12. A gas turbine engine comprising:
    a metallic fan containment case;
    a core engine having a static engine structure housing a compressor section, a combustor section and a turbine section, the core engine configured to receive core airflow;
    a fan arranged within the metallic fan containment case, the fan is coupled to the core engine and is arranged in a bypass flowpath provided between the core engine and the metallic fan containment case; and
    a fan nacelle surrounds the metallic fan containment case and provides an outer flow path surface of the bypass flowpath, wherein the metallic fan containment case includes first and second flanges forward of a fan blade, and the fan nacelle includes a nacelle inlet having first and second walls respectively secured to the first and second flanges by permanent fastening elements, wherein the nacelle inlet is a metallic structure that has an arcuate hollow cross-section, an apex of the arcuate cross-section provides a forward-most portion of the fan nacelle, the nacelle inlet is configured to provide a smooth entry for fluid into the bypass flowpath.

13. The gas turbine engine according to claim 12, wherein the permanent fastening elements is an adhesive.

14. The gas turbine engine according to claim 12, wherein the permanent fastening elements is a weld.

15. The gas turbine engine according to claim 12, wherein the permanent fastening elements is a rivet.

16. The gas turbine engine according to claim 12, wherein the fan containment case supports a rub strip configured to provide a seal relative to the fan.

17. The gas turbine engine according to claim 12, wherein the nacelle inlet is C-shaped.

18. The gas turbine engine according to claim 12, wherein the first wall is substantially perpendicular to the second wall.

19. The gas turbine engine according to claim 12, the metallic fan containment case having a mount at an aft end secured to flow exit guide vanes.

20. The gas turbine engine according to claim 12, wherein the nacelle inlet includes a reinforcing member secured between the first and second walls.

21. A gas turbine engine comprising:
    a metallic fan containment case including first and second flanges at a forward end of the metallic fan containment case;
    a core engine having a static engine structure housing a compressor section, a combustor section and a turbine section, the core engine configured to receive core airflow;
    a fan arranged within the metallic fan containment case, the fan is coupled to the core engine and is arranged in a bypass flowpath provided between the core engine and the metallic fan containment case; and
    a nacelle inlet having first and second walls secured to the first and second flanges of the metallic fan containment case by permanent fastening elements, the nacelle inlet is configured to provide a smooth entry for fluid into the fan nacelle, and wherein the nacelle inlet is a composite structure.

22. The gas turbine engine according to claim 21, wherein the nacelle inlet is C-shaped.

23. The gas turbine engine according to claim 21, wherein the first wall is substantially perpendicular to the second wall.

24. The gas turbine engine according to claim 21, the metallic fan containment case having a mount at an aft end secured to flow exit guide vanes.

25. The gas turbine engine according to claim 21, wherein the nacelle inlet includes a reinforcing member secured between the first and second walls.

26. The gas turbine engine according to claim 21, wherein the first and second flanges are forward of a fan blade.

* * * * *